(12) United States Patent
Belohoubek et al.

(10) Patent No.: US 8,219,808 B2
(45) Date of Patent: Jul. 10, 2012

(54) SESSION-BASED PUBLIC KEY INFRASTRUCTURE

(75) Inventors: Milan Belohoubek, Kanata (CA); Christopher Marcel Sicard, Casselman (CA); Elie Rodny Nasrallah, Ottawa (CA)

(73) Assignee: BCE Inc., Montreal, Quebec (CA)

( * ) Notice: Subject to any disclaimer, the term of this patent is extended or adjusted under 35 U.S.C. 154(b) by 1117 days.

(21) Appl. No.: 11/617,388

(22) Filed: Dec. 28, 2006

(65) Prior Publication Data

US 2008/0028206 A1   Jan. 31, 2008

(30) Foreign Application Priority Data

Dec. 28, 2005  (CA) ..................... 2531533

(51) Int. Cl.
*H04L 9/32* (2006.01)
*H04L 9/00* (2006.01)
*H04L 9/08* (2006.01)

(52) U.S. Cl. .................... 713/168; 380/277; 380/278

(58) Field of Classification Search .............. 380/277, 380/278; 713/168
See application file for complete search history.

(56) References Cited

U.S. PATENT DOCUMENTS

| | | | |
|---|---|---|---|
| 6,299,062 B1 | 10/2001 | Hwang | |
| 6,957,199 B1 * | 10/2005 | Fisher | 705/78 |
| 7,299,493 B1 * | 11/2007 | Burch et al. | 726/5 |
| 2002/0004900 A1 * | 1/2002 | Patel | 713/155 |
| 2003/0074580 A1 * | 4/2003 | Knouse et al. | 713/201 |
| 2003/0158960 A1 * | 8/2003 | Engberg | 709/237 |
| 2003/0172090 A1 | 9/2003 | Asunmaa et al. | |
| 2003/0190046 A1 * | 10/2003 | Kamerman et al. | 380/286 |
| 2004/0255137 A1 * | 12/2004 | Ying | 713/193 |
| 2005/0028009 A1 | 2/2005 | Neff | |
| 2006/0020783 A1 * | 1/2006 | Fisher | 713/156 |
| 2006/0075224 A1 * | 4/2006 | Tao | 713/164 |
| 2006/0248577 A1 * | 11/2006 | Beghian et al. | 726/5 |
| 2007/0044144 A1 * | 2/2007 | Knouse et al. | 726/8 |
| 2007/0242830 A1 * | 10/2007 | Conrado et al. | 380/285 |

OTHER PUBLICATIONS

Trust but verify: accountability for network services Aydan R. Yumerefendi and Jeffrey S. Chase Department of Computer Science Duke University Sep. 2004 EW 11: Proceedings of the 11th workshop on ACM SIGOPS European workshop.*
http://www.lawonline.biz/Signety.htm.

* cited by examiner

*Primary Examiner* — Kambiz Zand
*Assistant Examiner* — Benjamin Kaplan
(74) *Attorney, Agent, or Firm* — Alexander Anishchenko; Borden Ladner Gervais LLP

(57) ABSTRACT

A method and system for issuing anonymous, or user-independent, certificates for secure communication over a network, such as the Internet, to provide authentication and automated login to electronic services. A pool of user-independent certificates is generated. Once the user is identified, a user-independent roaming certificate is automatically transferred to the user's computer for encryption of communications during a single session. Once the user completes the online session or transaction, the issued digital certificate and associated key material is released back to the pool of digital certificates and can be re-used.

41 Claims, 3 Drawing Sheets

SESSION-BASED PUBLIC KEY INFRASTRUCTURE

FIELD OF THE INVENTION

The present invention relates generally to a public key infrastructure. More particularly, the present invention relates to a method and system for providing session-based keys that are anonymous and can permit automated login to services.

BACKGROUND OF THE INVENTION

Electronic services, such as electronic banking, internet commerce, and electronic government services, are becoming more common. Such services require a high level of security, but must also be user-friendly, and not require extraordinary effort on the part of the user to invoke the security protocols. Digital certificates and public key infrastructure (PKI) technologies provide strong data encryption, and are preferred over such technologies as Secure Socket Layer (SSL) for secure transmission between two endpoints. Digital certificates are conventionally issued to a person once that person's identity has been verified, such as by having the user enter a driver's license number, a credit card number, or other identifier associated to the user. An issued digital certificate is uniquely associated to the user, and includes identifying information concerning the user that is used to verify the authenticity of the certificate. Once issued, the user can use the certificate to participate in secure communications, encryption, digital signatures and the like. However, the user not only has to apply for a certificate before accessing the secure services, but must also store and manage the certificates, which has prevented their widespread adoption.

There are also services and products, such as online voting, polling and census-taking, that would benefit from the security offered by digital certificates and PKI, but require that the user remain anonymous. Conventional PKI certificates cannot be used for transmitting or collecting data in such offerings, as identifying information must be collected from the user in order to provide a certificate. Anonymous, single-use certificates have been proposed. For example, providing each potential user with a digital certificate embedded into a dedicated smart card or magnetically encoded on a driver's license has been suggested. Such solutions are generally thought to be impractical due to the large number of certificates required, potentially numbering in the millions for electronic voting or census taking. Issuing certificates on demand for a particular event, such as an election, would also put an unrealistic strain on any system, and would require an unmanageable number of live certificates to be issued at the same time for relatively short periods of use.

Digital certificates that contain just enough information to verify the user, without releasing other personal information, have also been proposed. However, such certificates are still user-specific and based on a user's identity, and must be obtained by the user, via a trusted user identity verification process, prior to gaining access to an electronic service.

It is, therefore, desirable to provide a system and method for issuing digital certificates that are transparent to the user and easily managed by a certificate authority. It is also desirable that the certificates are anonymous or user-independent.

SUMMARY OF THE INVENTION

It is an object of the present invention to obviate or mitigate at least one disadvantage of the prior art.

In a first aspect of the present invention, there is provided a public key infrastructure (PKI) authentication system. The PKI authentication system comprises an anonymous identity store, and an authentication application server. The anonymous identity store stores a pool of credential sets. The authentication application server provides a credential set from the pool of credential sets, including an anonymous unique identifier, to a user application requesting access to an electronic service application, the authentication application server further provides a public key associated with the electronic service application to the user application.

In embodiments of the first aspect of the present invention, the credential sets each comprise a user ID and a password; the anonymous unique identifier is a common name, which may be contained within a distinguished name. The credential sets can be user-independent and/or re-usable. The authentication system may further comprise a profile generation module for generating the pool of credential sets prior to the user attempting to access the electronic service application. The authentication application server may comprise a login component for requesting the credential set from the anonymous identity store and for sending the credential set to the user application. The system may also further comprise a service validation module for receiving a service request from the user application, and for returning a login application to the user application, which may be a web browser and/or a Java applet. The authentication application server may comprise a certificate component for receiving the electronic service application's public key certificate from a PKI system and for sending the electronic service application's public key certificate to the user application, and may also comprise means to validate the electronic service application's public key certificate which may use a certificate revocation list. Embodiments may further comprise a logout component for releasing the credential set for re-use, the logout component may comprise means for releasing the credential set at the expiry of a session. Further embodiments may comprise means to provide a temporary public/private key pair, associated to the credential set, to the user application, where the temporary public/private key pair may be provided in a roaming certificate.

In a second aspect of the present invention there is provided a method of authenticating a user for access to an electronic service application. The method comprises the steps of providing a credential set, from a store of pre-generated credential sets, to a user application; and providing both a temporary public/private key pair associated with the credential set and a public key associated with the electronic service application to the user application.

In embodiments of the second aspect of the present invention, the method may further comprise the step of validating the user for access to the electronic service application, wherein validating the user may comprise validating an access code provided by the user. The steps of providing the credential set and providing the both the public/private key pair and the public key may be transparent to the user in some embodiments of the present invention. In other embodiments, providing the credential set comprises requesting the credential set from an anonymous identity store; receiving the credential set from the anonymous identity store; and sending the credential set to the user application. The step of providing the public key may comprise accessing a certificate associated with the electronic service application; validating the electronic service application's certificate; and sending the electronic service application's certificate to the user application. The step of providing the temporary public/private key pair associated with the credential set may comprise providing a roaming certificate. In other embodiments, the method further comprises releasing the credential set for re-use at the expiry of a session. The method may comprise generating the store of pre-generated credential sets, in some embodiments, where the step of generating the store of pre-generated credential sets may comprise generating the store of pre-generated credential sets prior to attempted user access of the electronic service application and where the pre-generated credential sets may be user-independent credential sets.

In a third aspect of the present invention, the second aspect of the present invention and any of its embodiments are implemented for the use of online voting, electronic polling, census-taking, electronic commerce transactions, or electronic banking.

In a fourth aspect of the present invention, there is provided a session-based public key infrastructure system. The session based PKI system comprises a certificate authority, a roaming server and means to provide a public key. The certificate authority binds public keys to user-independent credential sets stored in an anonymous identity store. The roaming server provides a roaming certificate associated with one of the user-independent credential sets to a user application requesting access to an electronic service application. The means to provide a public key provides a public key associated with the electronic service application to the user application.

In embodiments of the fourth aspect of the present invention the credential sets each comprise a user ID, a password and an anonymous unique identifier, where the anonymous unique identifier may be a common name. The credential sets are re-usable in some embodiments. In other embodiments the system further comprises a profile generation module for generating the credential sets prior to the user attempting to access the electronic service application.

In a fifth aspect of the present invention, there is provided a method of transparently authenticating to an electronic service application. The method comprises sending an authentication request to an authentication system; receiving a certificate credential set from the authentication system permitting retrieval of an associated roaming profile certificate; receiving a public key associated with the electronic service application; and sending a message including a unique anonymous identifier associated with the credential set to the electronic application server to permit the electronic application server to retrieve a public key associated to the roaming certificate.

In embodiments of the fifth aspect of the present invention, sending the authentication request comprises sending a login request. Some embodiments further comprise sending a service request to the authentication system. The method may further comprise providing an access code to the electronic service application prior to sending the authentication request, which may further comprise receiving a signed token from the electronic service application, which may include a time stamp. The method may further comprise receiving an authentication confirmation, from the electronic service application, in response to successful decryption of the message with the public key associated to the roaming certificate.

In a sixth aspect of the present invention, the method of the fifth aspect is implemented by a web browser application.

BRIEF DESCRIPTION OF THE DRAWINGS

Embodiments of the present invention will now be described, by way of example only, with reference to the attached Figures, wherein.

DETAILED DESCRIPTION

Figure 1:
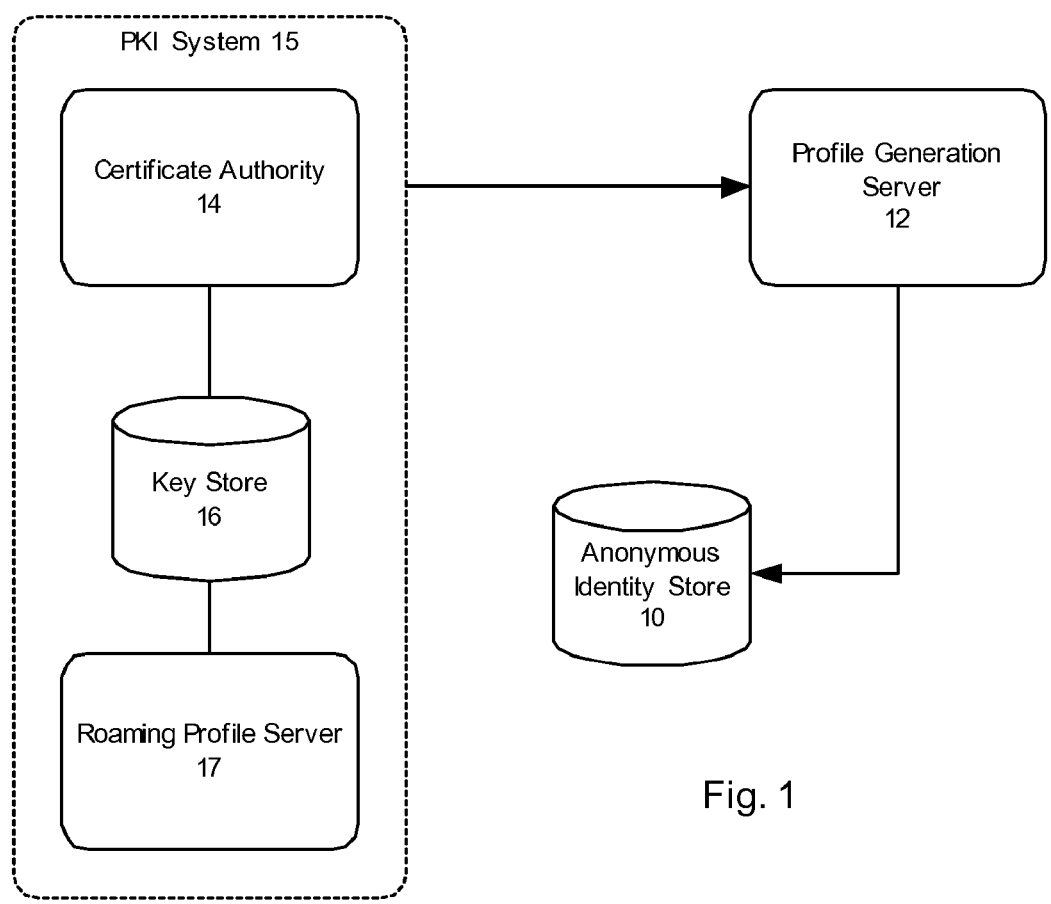
FIG. 1 shows a system for profile generation according to the present invention.

Generally, the present invention provides a method and system for issuing anonymous, or user-independent, certificates for secure communication over a network, such as the Internet, and can provide automated login to electronic services. Electronic services, such as banking, e-commerce, voting, polling and census-taking can particularly benefit.

In an embodiment, a pool of user-independent certificates is generated. When a user accesses an electronic service application, he identifies himself using credentials provided by the organization that administers the electronic service application. Once the user is identified, a user-independent digital roaming certificate is automatically transferred to the user's computer for encryption of communications during a single session. This certificate issuance is simple and transparent to the user. Once the user completes the online session or transaction, the issued digital certificate is released back to the pool of digital certificates and can be re-used.

Public key, or asymmetric key, cryptography is a form of cryptography that allows users to communicate securely without having prior access to a shared secret key. This is done by using a pair of cryptographic keys, designated as a public key and a private key, which are related mathematically. In public key cryptography, the private key is generally kept secret, while the public key may be widely distributed. In a general sense, one key locks a lock; while the other is required to unlock it. There are many forms of public key cryptography, such as public key encryption and public key digital signing. A PKI is an arrangement which provides third-party vetting of, and authentication of, user ID entities. It also allows binding of public keys to users. The public keys are typically issued as digital certificates.

PKI enables users to be authenticated to a service or system, and to use the public keys included in the certificates to encrypt and decrypt messages traveling back and forth over communication networks, such as the Internet, public switched telephone networks (PSTN), wireless networks, local area networks, and combinations thereof. In general, a PKI consists of client software, certificate databases, and server software, such as a certificate authority, for generating and binding public keys to a certificate. A first user can digitally sign messages using his private key, and a second user can check that signature using the public key contained in the first user's certificate issued by a certificate authority within the PKI. This enables two, or more, communicating parties to establish confidentiality, message integrity and user authentication without having to exchange any secret information in advance.

A public-key digital certificate binds a public key value to a set of information that identifies the entity, or subject of the certificate, such as a person, organization, account, or site, associated with use of a corresponding private key. The certificate is used by a certificate user, or relying party, that needs to use, and rely upon the accuracy of, the public key distributed via the certificate. A certificate user is typically an entity that is verifying a digital signature from the certificate's subject or an entity sending encrypted data to the subject. The degree to which a certificate user can trust the binding embodied in a certificate depends on several factors. These factors include the practices followed by the certificate authority in authenticating the subject; the certificate authority's operating policy, procedures, and security controls; the subject's obligations to protect the private key; and the stated undertakings and legal obligations of the certificate authority, such as warranties and limitations on liability.

X.509 is an ITU-T standard for PKI that specifies standard formats for public key certificates and a certification path validation algorithm. X.509 establishes a strict hierarchical system of certificate authorities for issuing and authenticating the certificates. In common usage an X.509 certificate refers to the Internet Engineering Task Force (IETF) PKI Certificate and Certificate Revocation List (CRL) Profile of the X.509 v3 certificate standard, as specified in RFC 3280, commonly referred to as PKIX.

Under the X.509 standard, a certificate authority issues a certificate binding a public key to a particular unique identifier, such as a distinguished name under the ITU-T X.500 protocol, or to an alternative name such as an e-mail address or a DNS-entry. To manage the certificates, the certificate authority stores the identifier in a directory according to a directory access protocol, such as Lightweight Directory Access Protocol (LDAP), that permits retrieval and authentication of the directory entry and associated certificate. The distinguished name identifies an entry in the directory, and describes an authorized user of the certificate authority. The distinguished name can be used for accessing and retrieving data to participate in a single sign-on environment. Generally, a distinguished name includes a common name, and proceeds with increasingly broader areas of identification until the country name is specified. Distinguished names are typically made up of the following components, as defined in the ITU-T X.520 standard: CN=common name, OU=organizational unit, O=organization, L=locality, ST=state or province, C=country name. The common name is a required component that identifies the person or object defined by the entry. For example: common name=Jane Doe or common name=corporation.com. The present invention will be described with reference to the terminology consistent with X.509 and X.500 standards, but, as will be understood by those of skill in the art, can be implemented in any PKI system having unique identifiers, or credentials, bound to public keys, regardless of the particular standard under which it operates.

According to the present invention, anonymous certificate credential sets are generated and stored for use by a user to access an electronic service application, and to retrieve a certificate, and its associated public key, for use in bi-directional encryption of data between the user and the electronic service application. An anonymous identifier is provided as the common name in the certificate's distinguished name field. The certificate credential sets are pre-generated with user ID/password pairs that are hidden from the end user wishing to securely access an electronic service or site. The user IDs and passwords can be bulk loaded into an authentication system, and roaming profiles can be activated. The application implementing the desired electronic service can interface with the authentication system to retrieve and release the certificate credential sets and use the system's encryption/decryption capability to protect a session. Since all credential sets are generated and activated prior to the session, users are not required to register for a certificate.

FIG. 1 illustrates a system for generating the credential sets, binding them to public keys, and storing them in an anonymous identity store 10. This system is generally invoked prior to run-time access of the electronic service application, and permits certificate credential sets to be generated off-line and bulk loaded to the anonymous identity store 10. The process can be automated. A profile generation module 12 creates PKI profiles that are loaded to become a pool of certificate credential sets during run-time. The profile generation module 12 generates user-independent credentials, such as user IDs and passwords, and associated distinguished names, containing unique common names, based on a set of configurable rules. For example, the user IDs, passwords and common names can be configured to have a minimum length and to contain certain character types. The server 12 ensures that all generated user IDs and distinguished names are unique and anonymous.

The profile generation module 12 communicates with a certificate authority 14 that generates the required private and public key pairs and binds the public keys to respective certificate profiles, associated with each of the distinguished names. Communication between the profile generation module 12 and the certificate authority 14 is encrypted, or effected over a secure channel according to any appropriate protocol, such as IPSec (Internet Protocol Security). The certificate authority 14 is one component of a PKI, such as PKI system 15, that also includes one or more caches or databases or key stores 16 and a roaming profile server 17, and any other components required to issue and manage PKI key material, including encrypting and signing certificates and user credentials. The public/private key pairs are stored in the key store 16, and access to them is provided through the roaming profile server 17. The roaming server 17 enables roaming certificates, as are known in the art, to permit a user to remotely access a public/private key pair stored in the key store 16. Roaming certificate solutions are available from such suppliers as Entrust, VeriSign and others. The PKI system 15 will generally be distributed across several trusted entities.

Once the certificate credential sets have been generated and bound to public keys, they are sent to the anonymous identity store 10, which can be, for example, a database, which may, in a non-limiting example, be an Oracle™ database. The output file that contains the credential sets generated by the profile generation module 12 is typically encrypted prior to transmission to the anonymous identity store 10, and is stored in the anonymous identity store 10 as roaming profile credentials. The roaming profiles can be tested prior to storage in the anonymous identity store 10.

Figure 2:
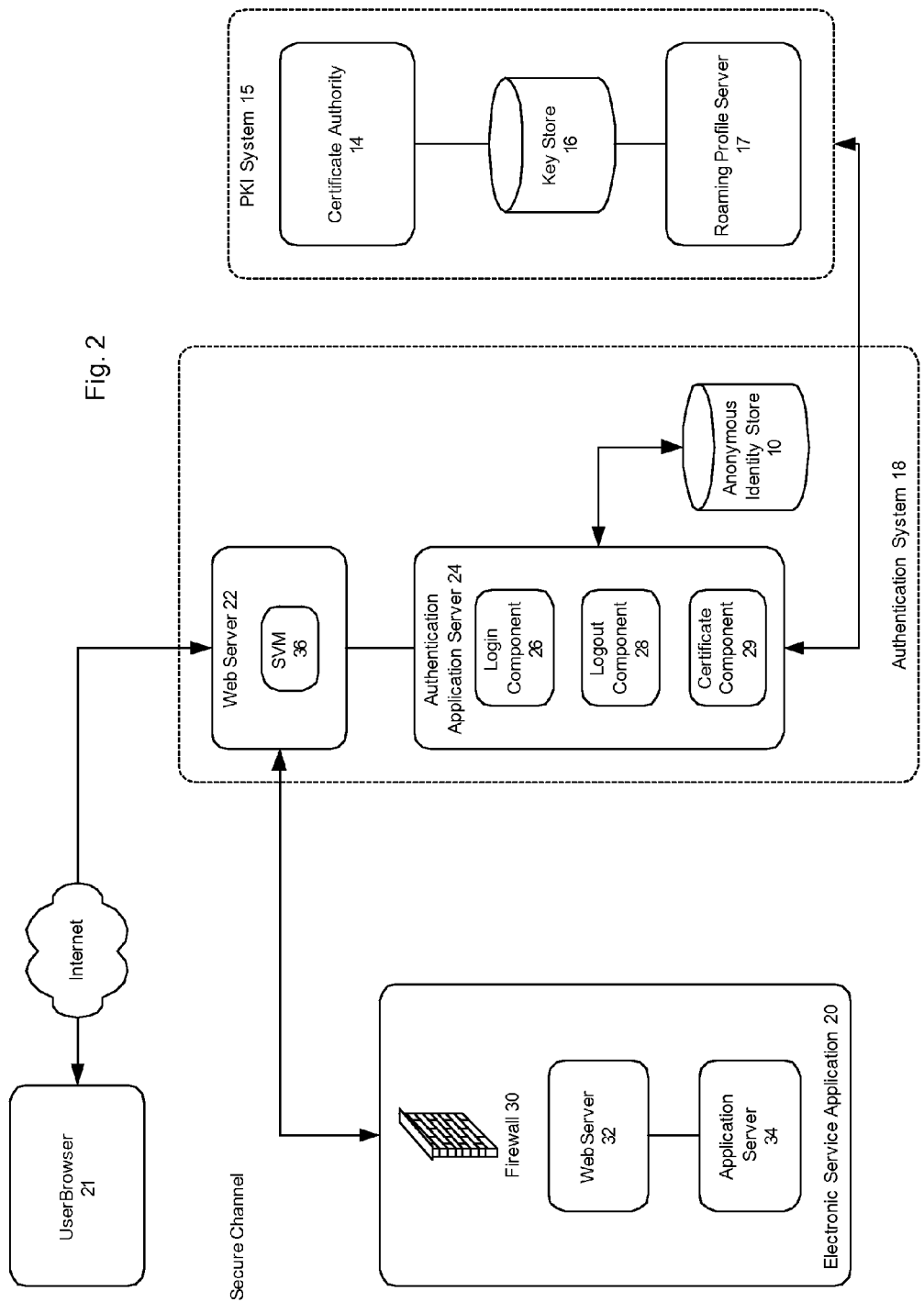
FIG. 2 shows a system for user authentication and session-based certificate issuance according to the present invention.

Referring to FIG. 2, the anonymous identity store 10 is the repository of the credential sets generated by the profile generation module 12, and is used by an authentication system 18 to provide the desired authentication services to an electronic service application 20 and a user browser 21. In the present example, these authentication services include automatic login and logout of user profiles. The authentication system 18 manages the issuance and retrieval of credential sets to users desiring to access the electronic service application 20. The authentication system 18 includes a web server 22 that can interface with, for example, the Internet; an authentication application server 24 communicating with the web server 22; and the anonymous identity store 10. The authentication application server 24 is a container for application components that execute in support of the electronic service application 20. In this instance, authentication application server 24 contains a login component 26, a logout component 28, to automatically login and logout user profiles, respectively, and a certificate component 29 to provide authentication by validating certificates with the certificate authority 14.

The login component 26 automatically logs a user into the next available credential set available from the anonymous identity store 10 by selecting a credential set that has, for example, an 'InUse flag set to 'Null'. The login component 26 then flags the credential set as 'CheckedOut' and provides a time stamp of the time checked out. If all profiles are flagged as 'Checkedout', the login component 26 can be configured to, for example, inform the user to try again later. The logout component 28 makes a credential set available by, for example, re-setting the 'In Use' flag and time stamp to 'Null'. Credential sets can also be released and returned to the pool if they have been checked out for a predetermined amount of time. This time is specified in an initialization setting, and protects against user sessions that fail to be properly logged out, or exceed a predetermined length of time.

The electronic service application 20 can include standard components, such as a firewall 30, a web server 32, and an application server 34, as well as other back-end systems as appropriate to the service offering. The electronic service application 20 can communicate with the authentication system 18 over a secure channel, such as an IPSec tunnel. The user browser 21 can be any standard browser application or other application that permits a user to access the Internet or other communication network. In the illustrated embodiment, the user browser 21 is also configured to accept applets, and is Java and cookie enabled.

Figure 3:
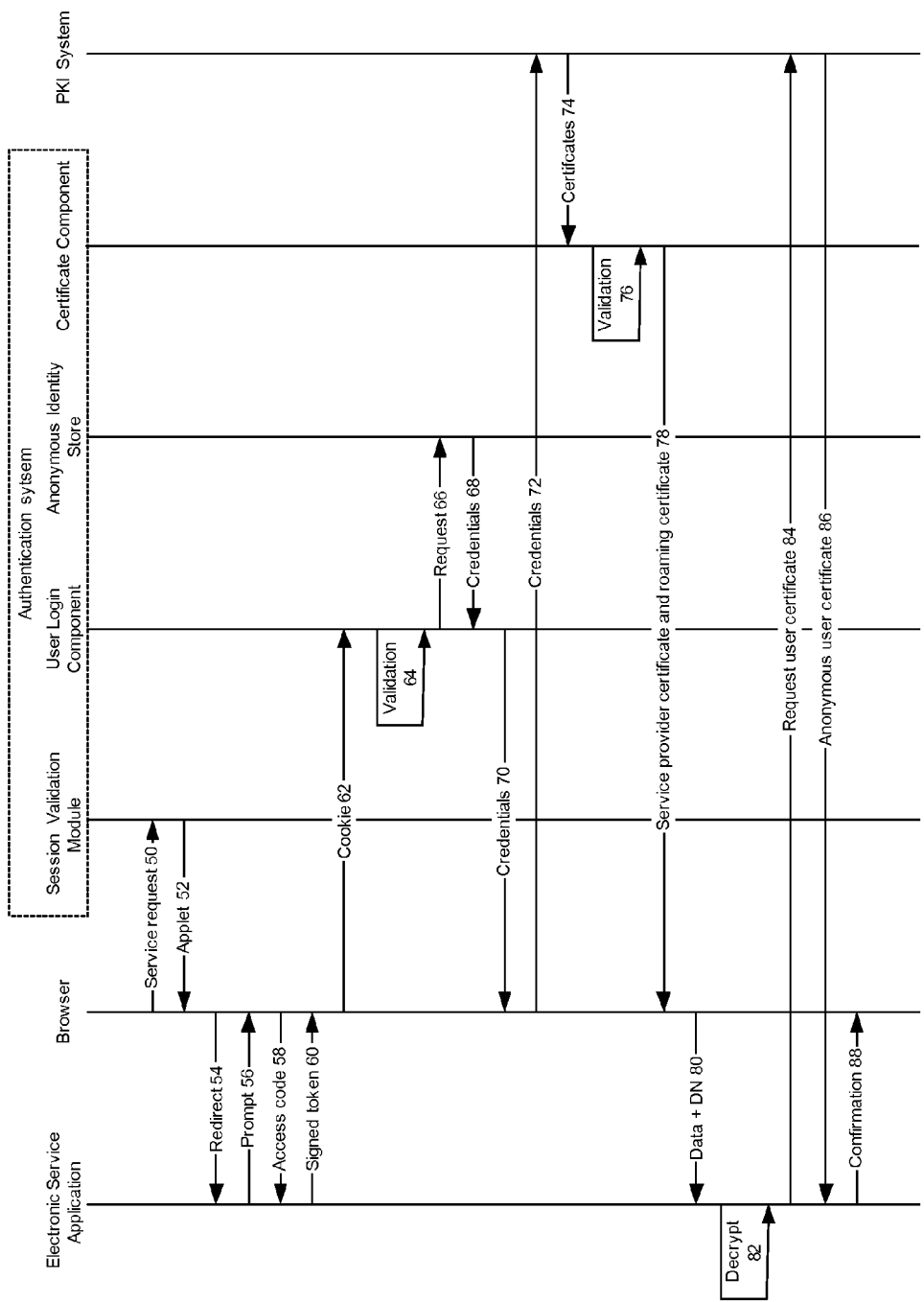
FIG. 3 shows an exemplary data flow in the system of FIG. 2.

Operation of the authentication system 18 to authenticate a user to the electronic service application 20 and to establish a secure communication session will now be described with reference to FIG. 2 and to FIG. 3, which shows an exemplary data flow. Prior to accessing the service, the user can be issued a unique access code used to identify him to, and authorize him to access, the service application. The user browser 21 sends a service request (50), requesting access to the electronic service application 20. The service request is intercepted and redirected to a session validation module 36 to establish a Secure Socket Layer (SSL), Transport Layer Security (TLS), or other security protocol, session.

The session validation module 36 is a component of web server 22, which returns a response to the request to the browser 21 as, for example, a Java applet (52). An HTML page, contained in an invisible frame, loads this applet at the user's browser 21. The JavaScript™ functions in the HTML page to access the applet and execute it. The browser 21 is then redirected (54) to the URL (Uniform Resource Locator) of the electronic service application 20, where the user is prompted to provide his access code (56). The access code is, in this exemplary embodiment, encrypted. The electronic service application 20 decrypts and validates (58) the access code and sends a signed token (60), including a time stamp, which can be placed as a cookie into the user's browser 21. The time stamp can, for example, be base64 encoded and packaged as a PKCS#7 structure.

The user browser 21 then initiates a call, such as an http GET request, to the user login component 26 to obtain a user ID/password pair from the anonymous identity store 10. The user browser 21 provides the cookie (62) containing the signed token and time stamp to the user login component 26. The user login component 26 validates (64) the authentication cookie by examining the signed token and time stamp, and requests a credential set (66), including a user ID and password, from the anonymous identity store 10. The user login component 26 retrieves the credential set (68) from the anonymous identity store 10 and sends it (70), in hidden fields, to the applet running on the user browser 21. The user login component 26 also checks out the credential set from the anonymous identity store 10 to identify that it is in use.

The applet on the user browser 21 receives and automatically submits (72) the credential set to the PKI system 15, through a login application programming interface (API), where it is used to access an associated roaming certificate and the service application's public key certificate. The roaming profile server 17 authenticates the credentials, and retrieves the service provider's public key certificate, such as an X.509 certificate, associated to the electronic service application 20, and the roaming certificate containing the user's temporary private and public key pair. The service application's public key certificate and the user's temporary roaming certificate are returned (74) to the certificate component 29. The certificate component 29 performs a CRL check (76) on service application's public key certificate. If valid, the certificate component 29 passes the service application's public key certificate (78) and the user's roaming certificate to the API running on the user's browser 21. The user browser 21 can then use the service application's public key to encrypt data and data messages it sends to the service application 20. Such encrypted data messages generated by the browser 21 will also include, in their header the distinguished name, including the unique common name, provided to the user with the credentials. During the log-in process, the initial data message generated by the user browser 21 may be a log-in data message or a test message, or may incorporate data which the user intends to be used by the electronic service application 20 as part of the desired service offered by the electronic service application 20, or a combination thereof.

The electronic service application 20 receives the encrypted data message (80), from the user browser 21, and decrypts it (82) using its private decryption key. The service application's private key is associated to its public key, and can, for example, be provided to the service application 20 when the authentication system is initialized, or when new credential sets are generated. When the data message has been successfully decrypted, the electronic service application 20 requests (84) and retrieves (86) the user's temporary and anonymous public encryption key, such as an X.509 certificate, from the key store 16 by providing the distinguished name, including the unique common name, to the certificate authority 14. The service application then encrypts a confirmation page to the user (88), using the user's temporary public key. The applet executed by the user's browser then decrypts the page using the user's temporary private decryption key. The user is now logged in to the electronic service application 20, and the necessary public keys have been provided to both parties to permit bi-directional encryption. The authentication procedure and key exchange is automatic and transparent to the user, and results in an anonymous login, since no information identifying the user is provided to the electronic service application 20.

In further embodiment, the initial encrypted data message sent to the service application can include further components necessary for fully logging in to the service application. For example, a user ID and password, previously provided as part of the credential set, could also be provided as part of the initial encrypted data message, and used to provide additional login security to the service application. The distinguished name, containing the unique common name, could also be encrypted in the initial data message to the service application.

In yet another embodiment the user browser 21 may send a message to the authentication application server 24 or the PKI system 15 authorizing and triggering the sending of the relevant credentials or the relevant keys directly to the electronic service application 20.

When the session ends, such as when the user logs out, the credential set is released and made available for re-use. The electronic service application 20 advises the logout component 28, for example, by issuing an http GET request, to notify that the session is complete and the user ID is no longer being used. The user logout component checks the credential set back into the anonymous identity store 10 by, for example, setting a Checkedout flag to 'Null, making it available to the next user. To avoid depleting the store, and to ensure a given certificate is not activated for too long a period, a temporary suspension of a session can be treated as a logout of an anonymous profile. When the user resumes the session, the authentication system 18 can treat the request as new login.

The authentication system 18 provides an entirely anonymous PKI capability. A PKI profile is issued to a user only for the duration of a session. The user does not need knowledge of the username, password or common name; users are automatically logged into the next available credential set and the certificate is only used for bi-directional encryption of data.

The components within the authentication system 18 are only used temporarily during a session and maintain anonymity for all users. Bi-directional encryption is used during each session, ensuring that data remains encrypted persistently to application servers and sensitive data is returned encrypted to the user. The authentication system 18 substantially avoids compromising the principles of privacy, confidentiality, integrity, and availability of any data that it handles. When a session is completed, the PKI profile is returned to the pool of profiles ready for a new session. There is little, or no, direct interaction between the user and the authentication system, during standard operation.

All information handled by the authentication system 18 can be protected against unauthorized access, modification, or deletion while in transit, during processing, and while stored at any point. The credential sets and their associated public/private key pairs are stored separately, further enhancing the security features of the system. Storage and/or logging of sensitive data such as personal data substantially conforms with known privacy and data protection standards, policies, and laws. In addition, the system is simple to administer, and, due to the release and re-use of certificates, only the number of live certificates that are necessary for peak traffic or access must be managed.

In addition, providing a pool of re-useable certificates provides additional security in the event of a brute force cryptographic attack on the system. In such a situation, the certificate pool can be quickly regenerated using keys that are more secure than the existing associated keys. For example new keys may be provided with a longer bit key length, as is known to those of skill in the art. The updated keys can then be made seamlessly available to the end users of the system.

The profiles are anonymous or user-independent, since they are not associated with a specific person, and can, therefore, be re-used to secure transactions over the Internet, or other communication network, between a user and a service provider. The complexity around the creation and issuance of a PKI certificate is completely hidden from the end user, yet the power and flexibility of the certificates are retained to secure the session. Particular applications for the system and method of the present invention include online voting; gathering information, such as census information; electronic banking and other electronic financial transactions; and secure on-line surveys of people or businesses.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A public key infrastructure (PKI) authentication system, comprising:
    an anonymous identity store configured to store a pool of credential sets, the credential sets being user-independent; and
    an authentication application server configured to provide a credential set from the pool of credential sets for use in an online session, including an anonymous unique identifier, to a user application requesting access to an electronic service application, the authentication application server further providing a public key associated with the electronic service application to the user application; and
    upon completion of the online session, releasing the credential set to the pool of credential sets.

2. The authentication system of claim 1, wherein the credential sets each comprise a user ID and a password.

3. The authentication system of claim 1, wherein the anonymous unique identifier is a common name.

4. The authentication system of claim 3, wherein the unique common name is contained within a distinguished name.

5. The authentication system of claim 1, wherein the credential sets are re-usable.

6. The authentication system of claim 1, further comprising a profile generation module to generate the pool of credential sets prior to the user attempting to access the electronic service application.

7. The authentication system of claim 1, wherein the authentication application server comprises a login component to request the credential set from the anonymous identity store and send the credential set to the user application.

8. The authentication system of claim 7, further comprising a service validation module to receive a service request from the user application, and to return a login application to the user application.

9. The authentication system of claim 8, wherein the user application is a web browser.

10. The authentication system of claim 9, wherein the login application is a Java applet.

11. The authentication system of claim 1, wherein the authentication application server comprises a certificate component to receive the electronic service application's public key certificate from a PKI system and to send the electronic service application's public key certificate to the user application.

12. The authentication system of claim 11, further comprising means to validate the electronic service application's public key certificate.

13. The authentication system of claim 12, wherein the means to validate the electronic service application's public key certificate uses a certificate revocation list.

14. The authentication system of claim 1, further comprising a logout component to release the credential set for re-use.

15. The authentication system of claim 14, wherein the logout component comprises means to release the credential set at the expiry of a session.

16. The authentication system of claim 1, further comprising means to provide a temporary public/private key pair, associated to the credential set, to the user application.

17. The authentication system of claim 16, wherein the temporary public/private key pair is provided in a roaming certificate.

18. A method of authenticating a user for access to an electronic service application, comprising:
- providing a credential set, from a store of pre-generated and user-independent credential sets, to a user application for use in an online session;
- providing both a temporary public/private key pair associated with the credential set and a public key associated with the electronic service application to the user application; and
- upon completion of the online session, releasing the credential set to the store of pre-generated user-independent credential sets.

19. The method of claim 18, further comprising validating the user for access to the electronic service application.

20. The method of claim 19, wherein validating the user comprises validating an access code provided by the user.

21. The method of claim 18, wherein providing the credential set and providing the both the public/private key pair and the public key are transparent to the user.

22. The method of claim 18, wherein providing the credential set comprises requesting the credential set from an anonymous identity store; receiving the credential set from the anonymous identity store; and sending the credential set to the user application.

23. The method of claim 18, wherein providing the public key comprises accessing a certificate associated with the electronic service application; validating the electronic service application's certificate; and sending the electronic service application's certificate to the user application.

24. The method of claim 18, wherein providing the temporary public/private key pair associated with the credential set comprises providing a roaming certificate.

25. The method of claim 18, further comprising releasing the credential set for re-use at the expiry of a session.

26. The method of claim 18, further comprising generating the store of pre-generated credential sets.

27. The method of claim 26, wherein generating the store of pre-generated credential sets comprises generating the store of pre-generated credential sets prior to attempted user access of the electronic service application.

28. Use of the method of claim 18 for online voting, electronic polling, census-taking, electronic commerce transactions, or electronic banking.

29. A session-based public key infrastructure system, comprising:
- a certificate authority configured to bind public keys to pre-generated user-independent credential sets stored in an anonymous identity store;
- a roaming server configured to provide a roaming certificate associated with one of the user-independent credential sets to a user application requesting access to an electronic service application for use in an online session;
- providing a public key, associated with the electronic service application, to the user application; and
- where the certificate authority is further configured to unbind the public keys from the user-independent credential set upon completion of the online session.

30. The system of claim 29, wherein the credential sets each comprise a user ID, a password and an anonymous unique identifier.

31. The system of claim 30, wherein the anonymous unique identifier is a common name.

32. The system of claim 29, wherein the credential sets are re-usable.

33. The system of claim 29, further comprising a profile generation module to generate the credential sets prior to the user attempting to access the electronic service application.

34. A method of transparently authenticating to an electronic service application, comprising:
- sending an authentication request to an authentication system;
- receiving and storing a certificate credential set from a pool of pre-generated credential sets from the authentication system permitting retrieval of an associated roaming profile certificate, the certificate credential set being user-independent;
- receiving and storing a public key associated with the electronic service application for use in an online session;
- sending a message including a unique anonymous identifier associated with the credential set to the electronic application server to permit the electronic application server to retrieve a public key associated with the roaming certificate; and
- upon completion of the online session releasing the certificate credential set to the authentication system.

35. The method of claim 34, wherein sending the authentication request comprises sending a login request.

36. The method of claim 34, further comprising sending a service request to the authentication system.

37. The method of claim 34, further comprising providing an access code to the electronic service application prior to sending the authentication request.

38. The method of claim 37, further comprising receiving a signed token from the electronic service application.

39. The method of claim 38, wherein the signed token includes a time stamp.

40. The method of claim 34, further comprising receiving an authentication confirmation, from the electronic service application, in response to successful decryption of the message with the public key associated with the roaming certificate.

41. A web browser running on a computer implementing the method of transparently authenticating to an electronic service application, comprising:
- sending an authentication request to an authentication system;
- receiving a certificate credential set from a pool of pre-generated credential sets from the authentication system permitting retrieval of an associated roaming profile certificate, storing the certificate credential on the computer, the certificate credential set being user-independent and for use in an online session;
- receiving a public key associated with the electronic service application;
- sending a message including a unique anonymous identifier associated with the credential set to the electronic application server to permit the electronic application server to retrieve a public key associated with the roaming certificate; and
- upon completion of the online session releasing the certificate credential set to the authentication system.

* * * * *